Dec. 13, 1932.  S. RUBEN  1,891,207
ELECTROLYTIC CONDENSER
Filed June 19, 1930
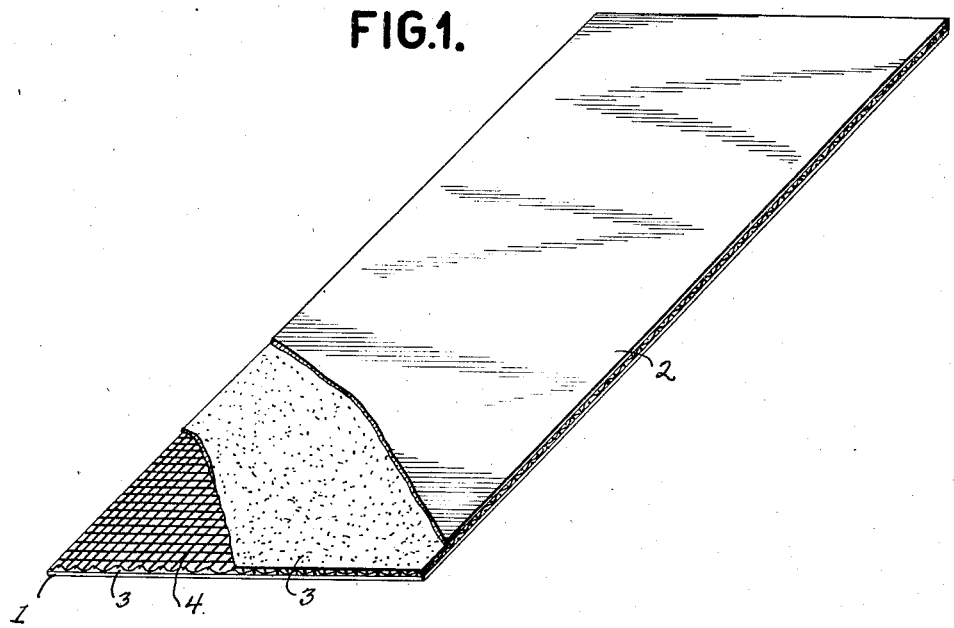
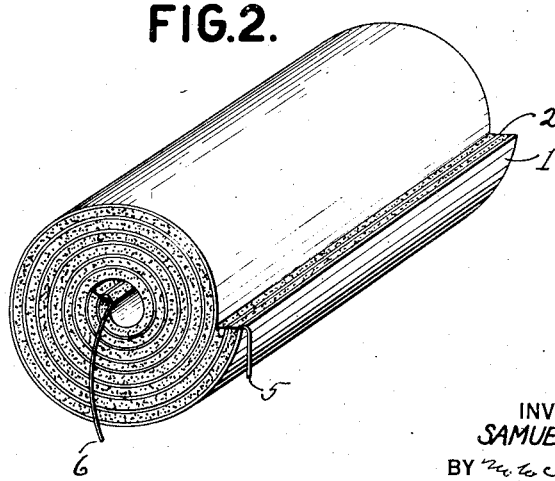
INVENTOR
SAMUEL RUBEN
BY
ATTORNEY Patented Dec. 13, 1932

1,891,207

UNITED STATES PATENT OFFICE

SAMUEL RUBEN, OF NEW ROCHELLE, NEW YORK, ASSIGNOR, BY MESNE ASSIGNMENTS, TO RUBEN CONDENSER COMPANY, OF NEW ROCHELLE, NEW YORK, A CORPORATION OF DELAWARE

ELECTROLYTIC CONDENSER

Application filed June 19, 1930. Serial No. 462,393.

This invention relates to electrolytic condensers and has for one of its objects the provision of a condenser that is durable and capable of operation at relatively high voltages. This and other objects are obtained by employing electrode plates of film-forming material, at least one of which, the anode, is previously electrolytically formed, separating the plates uniformly by a flexible retiform or textural spacer which is impregnated with a non-conductive material, filling the spacer with an electrolyte in plastic form, which later crystallizes, and applying a uniform pressure to the plates to insure continuous contact between the electrolyte and the electrodes. The invention of the present application is in the nature of an improvement upon the subject matter described and claimed in my prior United States Letters Patent No. 1,710,073, issued April 23, 1929, and a continuation in part of my copending application Serial No. 200,753 filed June 22, 1927.

Broadly, the condenser of my invention is composed fundamentally of an electrolytically formed electrode, the anode, and a formed or an unformed electrode with a reticular spacer therebetween, the spacer being impregnated with such non-conductive material as paraffin, and a film-maintaining electrolyte which is composed of ammonium borate and boric acid or a weaker acid, mixed with a viscous material composed of a glycol or glycerol. In coil form further laminations are employed so that no two electrode surfaces contact.

The methods of preparing the anode and the electrolyte are of fundamental importance. In a preferred form of the device the anode plate after being thoroughly chemically cleansed, is electrolytically formed in a solution containing 92% water, 5% ammonium borate and 3% boric acid by weight. Before immersion of the plate into the forming solution, that part of the surface which is to extend above the forming solution is treated or coated with a clear insulating material such as a lacquer, so that the electrolytically formed surface terminates slightly below the surface of the electrolyte. Such treatment prevents creepage and surface corrosion. The anode is formed at 450 volts in a solution which is maintained at about 60° C. for one hour, the current discharging being .1 ampere per square inch of surface to be formed.

The electrolyte is made by introducing into ethylene glycol at its boiling temperature, a well ground mixture of ammonium borate and boric acid, all dust and grit being kept out of the solution. At this temperature the ethylene glycol forms a clear solution but as the mixture cools crystals form therein. At normal room temperatures the resultant electrolyte composition is a viscous mass of molasses-like consistency containing crystalline material. This viscous composition appears to be a mixture of a syrupy material and a mass of relatively small white crystals. When applied to the paraffin coated retiform spacer it is heated to about 60° C. to produce a sufficient plasticity for spreading. The condenser arrangement is then wound upon a wooden mandrel, and wrapped in such an insulating material as varnished paper; it is placed in a metal container, after which the whole is dipped into asphaltum and dried. The condenser is then aged at about 450 volts for a period of twelve hours.

In the invention the viscous material is not confined to ethylene glycol for glycerine and various other glycols or glycerols are applicable; after many tests, however, ethylene glycol was found to give the best results. Electrolyte compositions prepared with the use of glycerols in lieu of glycols, with the proportions of the ingredients remaining substantially the same, appear to be thicker, that is, to have a lower degree of flowability. Electrolyte compositions prepared in accordance with the present invention with the proportions of the ingredients varying within reasonable limits may vary in consistency at ordinary temperatures, such as normal room temperatures, from a viscous mass of molasses-like consistency to a gummy thick paste of sufficient body to be substantially self-sustaining for a considerable period of time when heaped on a flat surface. Such variations, however are to be kept within limits which insure the ultimate presence in the finished composition of a mass of relatively small solid particles or crystals. The terms "crystallized electrolyte" and "crystalline compound" used in the claims are intended to describe such electrolyte compositions. Many experiments were performed also in respect to the acid to be used in the filler. Boric acid was selected as most desirable for high voltage use, though other acids, such as citric, malic, lactic, tartaric or phosphoric were found to give satisfactory results when a low potential current was applied. Salts of the acid selected may be used to complete the film-maintaining electrolyte in the filler in lieu of ammonium borate. The preferred filler or film-maintaining electrolyte is composed of ammonium borate 42%, boric acid 27% and ethylene glycol 31% by weight. And while aluminum is the material best suited for electrodes, other materials, such as magnesium, can be used.

The term "borate" as used in the claims is intended to cover any compound including the borate radical and hence includes boric acid and its salts, and the term "component" used in connection with the polyhydric alcohols set forth is intended to cover any selected polyhydric alcohol material of the glycols and glycerols which may include other substances such as water in amounts ordinarily found in materials commercially used in the formation of the present electrolyte compositions, so long as such substances are not deleterious to the formation of reactionary products and the various actions and operations of the resultant electrolyte and condensers.

In the drawing,

Fig. 1 is a perspective view partly broken away, of an embodiment of the invention showing a flat plate condenser.

Fig. 2 is a perspective view of the invention arranged in coiled form.

The same reference characters have been used to denote similar parts, as, 1 and 2 represent aluminum electrode plates, one of which, the anode, is preliminarily thoroughly cleansed; 4 is an open meshed fibre cloth impregnated with paraffin and 3 an applied filler of ammonium borate, boric acid and ethylene glycol. In Fig. 2 the two terminals of the device are indicated at 5 and 6.

What I claim is:

1. In an electrolytic condenser the combination, with spaced electrode plates, one of which is electrolytically film-formed, of a conductive composition therebetween, containing ethylene glycol and a film-maintaining electrolyte of one of the weak acids boric, citric, malic, lactic, tartaric and phosphoric with a salt of one of said acids suspended therein, the whole forming a crystallized electrolyte.

2. An electrolytic condenser comprising a pair of separated electrodes of opposed polarity, one of which is electrolytically film-formed, a pair of fibre spacers impregnated with a non-conductive material, one spacer located on each face of one of the electrodes, a viscous electrolyte mixture containing ethylene glycol, a weak acid and a salt thereof, the entire unit being coiled to circular form after assembly, said electrolyte in appearance being a viscous mass of a syrupy material in which solid particles are suspended and of at least molasses-like consistency.

3. In an electrolytic cell, the combination with a pair of opposed plates of opposite polarity, one of which is electrolytically film-formed, of a flexible reticular spacer impregnated with a non-conductive material and free from electrolysis between its fibres and the plates, and interposed between the plates of the pair, and a film-maintaining crystallized electrolyte within the meshes of said spacer, said electrolyte consisting of ammonium borate, boric acid and ethylene glycol.

4. An electrolytic condenser comprising in combination, electrode plates one of which is electrolytically film-formed, spaced apart by a recticular spacer impregnated with an insulating material and an electrolyte composed of ammonium borate, boric acid and ethylene glycol, respectively, in substantially the percentages by weight: 42, 27 and 31.

5. In an electrolytic condenser, the combination with spaced electrode plates one of which is electrolytically film-formed, of a conductive composition therebetween containing ethylene glycol and a film-maintaining supersaturated electrolyte of a weak acid and a salt thereof suspended therein, the proportions of ethylene glycol and electrolyte being such that a mixture of paste consistency is formed when heated to 60° C.

6. In an electrolytic condenser, the combination, with a pair of electrodes, one of which is electrolytically film-formed, a spacer therebetween, of a conductive medium comprising a mixture of a glycerol and a film-maintaining electrolyte composition of a supersaturated solution of boric acid and ammonium borate, said glycerol affording viscosity, said electrolyte in appearance being a viscous mass of a syrupy material in which solid particles are suspended and of at least molasses-like consistency.

7. In an electrical condenser, an electrolyte composed of crystalline compounds of ammonium borate, boric acid and ethylene glycol.

8. In an electrical condenser, an electrolyte composed of crystalline compounds of ammonium borate, a weak acid and a polyhydric alcohol component of one of the polyhydric alcohols falling within the classes glycols and glycerols, the whole forming a plastic mixture.

9. In an electrical condenser, an electrolyte composed of crystalline compounds of ammonium borate, boric acid and a glycol.

10. The method of making an electrolytic condenser which consists in partially coating the anode member of two electrode plates with an insulating material, electrolytically forming the uncoated part of said plate in a solution containing ammonium borate, boric acid and water, at substantially 450 volts, mixing finely ground ammonium borate and boric acid with ethylene glycol at the boiling temperature as an electrolyte, said electrolyte in appearance at normal room temperatures being a viscous mass of a syrupy material in which solid particles are suspended and of at least molasses-like consistency, and applying said mixture in plastic form to a reticular spacer and compressing said spacer and electrolyte between said plate and connecting said plates as cooperating electrodes in an electrical circuit.

11. The method of making a condenser electrolyte which consists in dissolving in boiling ethylene glycol a mixture of ammonium borate and boric acid, the respective parts by weight being substantially 31%, 27% and 42%.

12. An electrolytic condenser comprising cooperating electrode plates, one of which is electrolytically formed spaced apart by a textural material impregnated with an insulating material and a viscous electrolyte composed of ammonium borate, boric acid and one of the polyhydric alcohols falling within the classes glycols and glycerols, said electrolyte in appearance being a viscous mass of a syrupy material in which solid particles are suspended and of at least molasses-like consistency.

13. An electrolytic condenser comprising a pair of spaced electrodes, at least one of which is electrolytically film-formed, a porous spacer material located between said electrodes and a viscous conductive composition interposed between said electrodes and impregnating said spacer material, said conductive composition comprising ethylene glycol and a film-maintaining electrolyte of a weak acid and a salt of a weak acid, said electrolyte in appearance being a viscous mass of a syrupy material in which solid particles are suspended and of at least molasses-like consistency.

14. In an electrolytic condenser, the combination comprising a pair of spaced electrodes, at least one of which is electrolytically film-formed, a porous spacer material located between said electrodes, and a viscous conductive composition interposed between said electrodes and impregnating said spacer material, said conductive composition including a supersaturated solution of boric acid, ammonium borate and one of the polyhydric alcohols falling within the classes glycols and glycerols, said electrolyte in appearance being a viscous mass of a syrupy material in which solid particles are suspended and of at least molasses-like consistency.

15. In an electrolytic condenser the combination with film-forming electrodes, of a spacer positioned between said electrodes impregnated with a viscous electrolyte composition formed from a mixture comprising a weak acid, a salt selected from the salts of boric acid and salts of the other weak acids, and a polyhydric alcohol component of one of the polyhydric alcohols falling within the classes glycols and glycerols, said composition including the products obtained by reacting the polyhydric alcohol component with a borate present at substantially the boiling temperature of the polyhydric alcohol component, said electrolyte in appearance being a viscous mass of a syrupy material in which solid particles are suspended and of at least molasses-like consistency.

16. In an electrolytic condenser the combination with film-forming electrodes, of a spacer positioned between said electrodes impregnated with a viscous electrolyte composition formed from a mixture comprising a weak acid, a salt selected from the salts of boric acid and salts of the other weak acids, and a glycol component, said composition including the products obtained by reacting the glycol component with a borate present at substantially the boiling temperature of the glycol component, said electrolyte in appearance being a viscous mass of a syrupy material in which solid particles are suspended and of at least molasses-like consistency.

17. A viscous electrolyte composition for electrolytic condensers formed from a mixture comprising a weak acid, a salt selected from the salts of boric acid and the salts of the other weak acids, and a polyhydric alcohol component of one of the polyhydric alcohols falling within the classes glycols and glycerols, said composition including the products obtained by reacting the polyhydric alcohol component with at least the weak acid with the acid, the salt and the polyhydric alcohol component present in the mixture at substantially the boiling temperature, said electrolyte in appearance being a viscous mass of a syrupy material in which solid particles are suspended and of at least molasses-like consistency.

18. A viscous electrolyte composition for electrolytic condensers formed from a mixture comprising a weak acid, a salt selected from the salts of boric acid and salts of the other weak acids, and a polyhydric alcohol component of one of the polyhydric alcohols falling within the classes glycols and glycerols, said composition including the products obtained by reacting the polyhydric alcohol component with a borate present at substantially the boiling temperature of the polyhydric alcohol component, said electrolyte in appearance being a viscous mass of a syrupy material in which solid particles are suspended and of at least molasses-like consistency.

19. A viscous electrolyte composition for electrolytic condensers formed from a mixture comprising a weak acid, a salt selected from the salts of boric acid and salts of the other weak acids, and a glycol component, said composition including the products obtained by reacting the glycol component with a borate present at substantially the boiling temperature of the glycol component, said electrolyte in appearance being a viscous mass of a syrupy material in which solid particles are suspended and of at least molasses-like consistency.

20. A viscous electrolyte composition for electrolytic condensers comprising the products obtained by reacting a polyhydric alcohol component of one of the polyhydric alcohols falling within the classes glycols and glycerols with ammonium borate and a weak acid at substantially the boiling temperature of the polyhydric alcohol component, said electrolyte in appearance being a viscous mass of a syrupy material in which solid particles are suspended and of at least molasses-like consistency.

21. A viscous electrolyte composition for electrolytic condensers comprising the products obtained by reacting a polyhydric alcohol component of one of the materials ethylene glycol and glycerine with ammonium borate and boric acid at substantially the boiling temperature of the polyhydric alcohol component, said electrolyte in appearance being a viscous mass of a syrupy material in which solid particles are suspended and of at least molasses-like consistency.

22. A viscous electrolyte composition for electrolytic condensers comprising the products obtained by reacting an ethylene glycol component with ammonium borate and boric acid at substantially the boiling temperature of the ethylene glycol component, said electrolyte in appearance being a viscous mass of a syrupy material in which solid particles are suspended and of at least molasses-like consistency.

Signed at New York, in the county of New York and State of New York, this 17 day of June, A. D. 1930.

SAMUEL RUBEN.